(12) United States Patent
Newstadt et al.

(10) Patent No.: US 9,106,780 B1
(45) Date of Patent: Aug. 11, 2015

(54) METHOD AND APPARATUS FOR CONTROLLING AUDIO/VIDEO DISPLAY USING A POLICY

(75) Inventors: Keith Newstadt, Newton, MA (US); Adam P. Schepis, Milford, MA (US)

(73) Assignee: Symantec Corporation, Mountain View, CA (US)

( * ) Notice: Subject to any disclaimer, the term of this patent is extended or adjusted under 35 U.S.C. 154(b) by 1540 days.

(21) Appl. No.: 12/391,189

(22) Filed: Feb. 23, 2009

(51) Int. Cl.
*H04N 1/00* (2006.01)
*H04N 21/8355* (2011.01)
*G06F 11/30* (2006.01)
*H04L 12/26* (2006.01)

(52) U.S. Cl.
CPC ........ *H04N 1/00885* (2013.01); *G06F 11/3055* (2013.01); *G06F 11/3065* (2013.01); *H04L 43/10* (2013.01); *H04N 21/8355* (2013.01)

(58) Field of Classification Search
CPC ........... H04N 1/00885; H04N 21/8355; G06F 11/3065; H04L 43/10
USPC ............. 725/25–29, 105, 114, 116, 117, 143, 725/144, 146, 147
See application file for complete search history.

(56) References Cited

U.S. PATENT DOCUMENTS

| 6,025,869 A * | 2/2000 | Stas et al. ......................... 725/28 |
| 2004/0128681 A1 * | 7/2004 | Hancock et al. ................. 725/30 |
| 2004/0143839 A1 * | 7/2004 | Gonzales-Caiazzo et al. . 725/29 |
| 2005/0028208 A1 * | 2/2005 | Ellis et al. ....................... 725/58 |
| 2005/0183143 A1 * | 8/2005 | Anderholm et al. ............ 726/22 |
| 2007/0180463 A1 * | 8/2007 | Jarman ............................. 725/28 |
| 2008/0267194 A1 * | 10/2008 | Trethewey ...................... 370/401 |

OTHER PUBLICATIONS

"TimeMachine Timer," Product Description, Copyright 1998-2009 Nextphase, Inc. d.b.a. Family Safe Media. Downloaded from web site http://www.familysafemedia.com/tv_time_machine_tv_timer.html on May 15, 2009.
"TV Timer—BOB," Product Description, Copyright 1998-2009 Nextphase, Inc. d.b.a. Family Safe Media. Downloaded from web site http://www.familysafemedia.com/tv_timer_hopscotch_bob.html on May 15, 2009.
"Hopscotch BOB," Review by PC Magazine, Review Date Sep. 8, 2006. Downloaded from web site http://www.pcmag.com/article2/0,2817,2013756,00.asp on May 15, 2009.

(Continued)

*Primary Examiner* — Benjamin R Bruckart
*Assistant Examiner* — Jason Thomas
(74) *Attorney, Agent, or Firm* — Wilmer Cutler Pickering Hale and Dorr LLP (57) ABSTRACT

A method and apparatus for controlling audio/video display using a policy is disclosed. In one embodiment, a method for policy-based control of audio/video display including monitoring at least one of at least one audio/video signal input or at least one power outlet using a policy, wherein the policy defines information for controlling audio/video display and in response to a detection of at least one of an audio/video signal or an electrical power, routing the at least one of the audio/video signal or the electrical power according to the policy.

20 Claims, 4 Drawing Sheets

(56) References Cited

OTHER PUBLICATIONS

"EMS Power Cop," Product Description. Downloaded from web site http://www.emspowercop.com/ on May 15, 2009.

"Time-Scout™ Monitor," Product Description, Copyright 2002-2008 Card Access, Inc. Downloaded from web site http://www.time-scout.com/products/index.php on May 15, 2009.

* cited by examiner

METHOD AND APPARATUS FOR CONTROLLING AUDIO/VIDEO DISPLAY USING A POLICY

BACKGROUND OF THE INVENTION

1. Field of the Invention

Embodiments of the present invention generally relate to entertainment device monitoring and, more particularly, to a method and apparatus for controlling audio/video display using a policy.

2. Description of the Related Art

Multimedia content is accessible within homes and other housings through a variety of modes and/or entertainment devices. For example, the multimedia content may be generated and/or viewed through various websites (e.g., online games and/or the like) and/or entertainment devices, such as video game consoles, convertors (e.g., cable box convertors), media players (e.g. CD/DVD players and/or the like) and/or audio/video display devices (e.g., a television, a monitor and/or the like). Generally, the video game consoles, the convertors and/or the media players process and transmit audio/video signals to the audio/video display devices. Nonetheless, such modes and/or entertainment devices are easily accessible to young people (e.g., children, adolescents) among other individuals. In various instances, children and adolescents are presented with the multimedia content that depicts or expresses concepts and images that may be deemed inappropriate and/or undesirable by parents and/or guardians.

While many children and/or adolescents intentionally access inappropriate and/or undesirable multimedia content; sometimes, such multimedia content may be accidentally presented. For example, a video gaming console may be used to play a game that portrays extreme violence or adult material and hence, may not be suitable for children and/or adolescents. As such, parents or other regulators either have little or no control over the content that is accessible through various entertainment modes and/or devices in daily environments, such as a home or a community gathering.

Currently, parents utilize various available applications to enforce control policies for only one type of entertainment device. For example, certain televisions and convertors allow control over specific channels and/or multimedia content associated with a particular parental rating. Several content filtering mechanisms also exist for blocking inappropriate and/or undesirable multimedia content accessible through the Internet at a computer. However, conventional techniques fail to monitor or filter multimedia content associated with multiple entertainment devices that are accessible to children and/or adolescents in the home. Furthermore, the entertainment devices, such as DVD players and/or video gaming consoles, do not implement or enforce a policy for controlling audio/video display. As a result, the children and/or the adolescents may be exposed to inappropriate and/or undesirable multimedia content.

Therefore, there is a need in the art for a method and apparatus for controlling audio/video display using a policy.

SUMMARY OF THE INVENTION

Embodiments of the present invention generally include a method and apparatus for controlling an audio/video display using a policy. In one embodiment, a method for policy-based control of audio/video display including monitoring at least one of at least one audio/video signal input or at least one power outlet using a policy, wherein the policy defines information for controlling audio/video display and in response to a detection of at least one of an audio/video signal or an electrical power, routing the at least one of the audio/video signal or the electrical power according to the policy.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
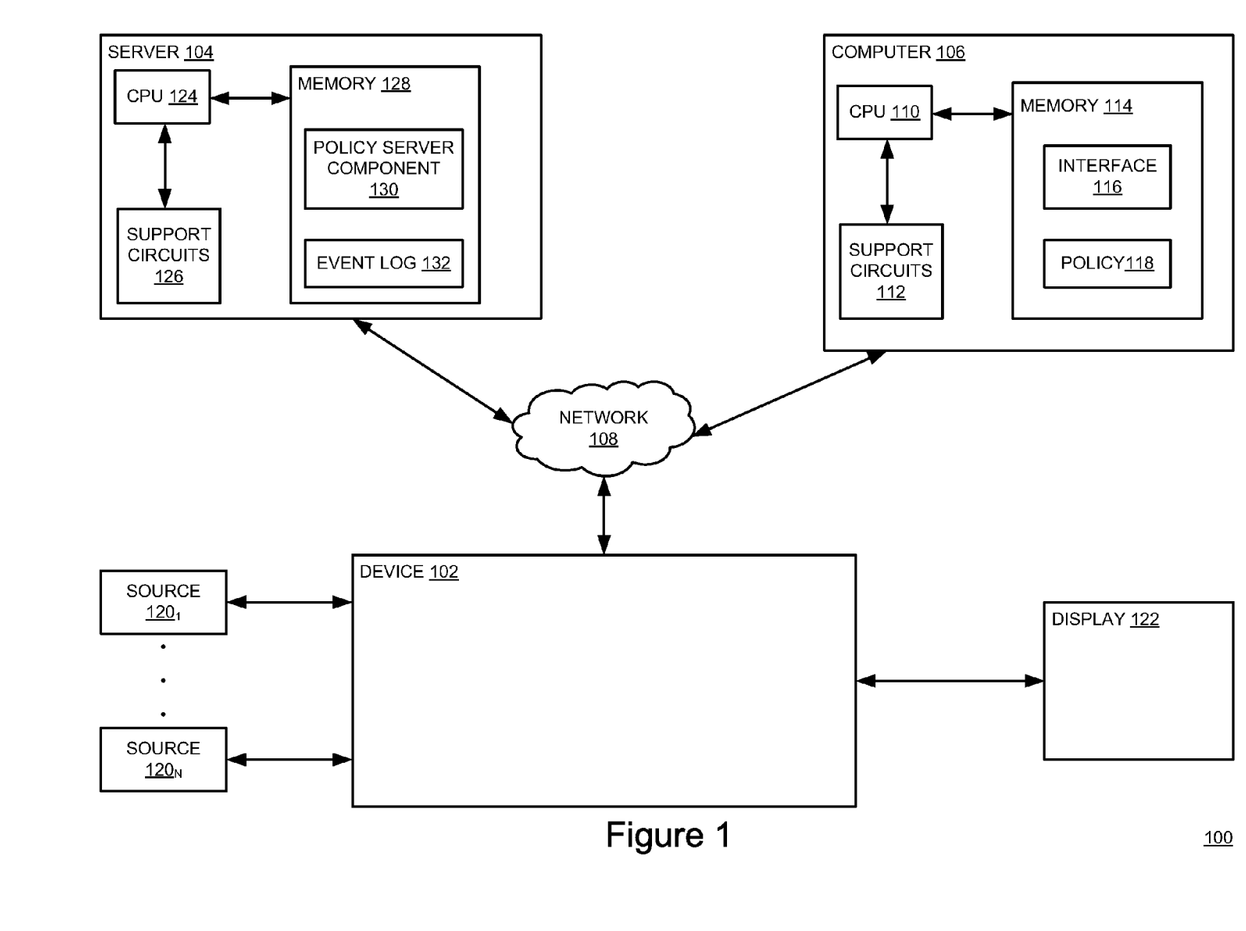
FIG. 1 is a block diagram of a system for configuring a device with a policy for controlling audio/video display according to one or more embodiments of the present invention.

FIG. 1 is a block diagram of a system 100 for configuring a device with a policy for controlling audio/video display according to one or more embodiments. In one embodiment, the system 100 includes a device 102, a server 104 and a computer 106 where each is coupled to each other through a network 108.

According to one or more embodiments, the server 104 is a type of computing device (e.g., a laptop, a desktop, a Personal Desk Assistant (PDA), a tablet, a mobile phone and the like) that comprises a central processing unit (CPU) 124, various support circuits 126 and a memory 128. The CPU 124 may comprise one or more commercially available microprocessors or microcontrollers that facilitate data processing and storage. Various support circuits 126 facilitate operation of the CPU 110 and may include clock circuits, buses, power supplies, input/output circuits and/or the like. The memory 128 includes a read only memory, random access memory, disk drive storage, optical storage, removable storage, and the like. The memory 128 includes various software packages, such as a policy server component 130. The memory 128 includes various data, such as an event log 132. In one embodiment, the device 102 communicates one or more events to the policy server component 130, which stores information regarding such events in the event log 132. For example, the event log 132 may indicate that cable television was viewed from 2:44 pm to 6:01 pm.

The computer 106 is a type of computing device (e.g., a laptop, a desktop, a Personal Desk Assistant (PDA), a tablet, a mobile phone and the like) that comprises a central processing unit (CPU) 110, various support circuits 112 and a memory 114. The CPU 110 may comprise one or more commercially available microprocessors or microcontrollers that facilitate data processing and storage. Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various software packages, such as an interface 116. The memory 114 further includes various data, such as a policy 118.

The network 108 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The interface 116 includes software code that is executed by the CPU 110 in order to facilitate configuration of the policy 118 according to various embodiments. For example, a computer user (e.g., a parent) may establish various control settings within the policy 118 (e.g., a parental control policy) through a graphical user interface generated by the interface 116. Furthermore, the various control settings may be used by the device 102 to route an audio/video signal and/or electrical power. According to various embodiments, the device 102 examines the various control settings to determine whether to permit or prevent communication of the audio/video signal or the electrical power to the display 122 and/or any other entertainment device. In another embodiment, the device 102 examines the various control settings to identify various events, which are communicated and stored in the event log 132.

The device 102 may be coupled to one or more sources 120 of audio/video signals and/or a display 122. According to one or more embodiments, the sources 120 may include any combination of various entertainment devices, such as video game consoles (e.g. a NINTENDO Wii) and media players (e.g., DVD players, digital recorders and/or the like). Furthermore, the device 102 provides the sources 120 with electrical power. For example, power chords for the various entertainment devices, as well as any accessory components (e.g., a wireless gateway for the video game consoles), may be plugged into power outlets on the device 102, as explained further below.

The display 122 is a type of entertainment device (e.g., a television, a computer monitor, a projector and/or the like) for processing audio/video signals. Similarly, the display 122 may use the device 102 as a source of electrical power. In one embodiment, the display 122 decodes the audio/video signal generated by the sources 120 and presents the audio/video signal to a user. For example, the audio/video signal may be projected onto a screen.

According to various embodiments, the device 102 controls communication of the audio/video data (e.g., signals) to the display 122 from the sources 120. In one embodiment, the device 102 monitors one or more audio/video signal inputs and/or one or more power outlets using the policy 118. As explained further below, the device 102 is configured to detect an audio/video signal at the audio/video signal inputs and/or electrical power at one or more power outlets and route the audio/video signal and/or the electrical power according to the policy 118. As an example, the device 102 is designed to monitor entertainment devices engaged by children and control various activities according to various parent control settings within the policy 118. The policy 118 may dictate specific time periods and/or time limits for using a particular entertainment device. For example, the device 102 may prevent a child from playing video games after 10 pm and/or more than three hours per day.

In one embodiment, the device 102 generates and communicates information regarding one or more events to the server 102 in accordance with the policy 118. As a result, the one or more events are stored in the event log 132. In another embodiment, the device 102 sends a regular heartbeat (e.g., an electric signal) to the server 104 and/or the computer 106. If the device 102 becomes disabled or disconnected, a missing or skipped heartbeat alerts the server 104 and/or the computer 106 as to the disruption. In yet another embodiment, the device 102 detects a disruption at an audio/video input and/or a power outlet. For example, the device 102 determines that a chord is unplugged from the audio/video input and/or the power outlet. The device 102 communicates information regarding any type of disruption to the policy server component 130 for storage within the event log 132.

In another embodiment, the device 102 communicates messages to be presented to a user on the display 122. For example, the device 102 communicates messages related to various events, such as policy violations (e.g., "Playing Video Games past midnight is not permitted", "Blocked by SYMANTEC Norton Family Safety" and/or the like). As another example, the device 102 communicates messages related to future events (e.g., "There are fifteen minutes of video game time remaining"). Such messages may be stored in the event log 132 and viewed by a parent at a later date.

Figure 2:
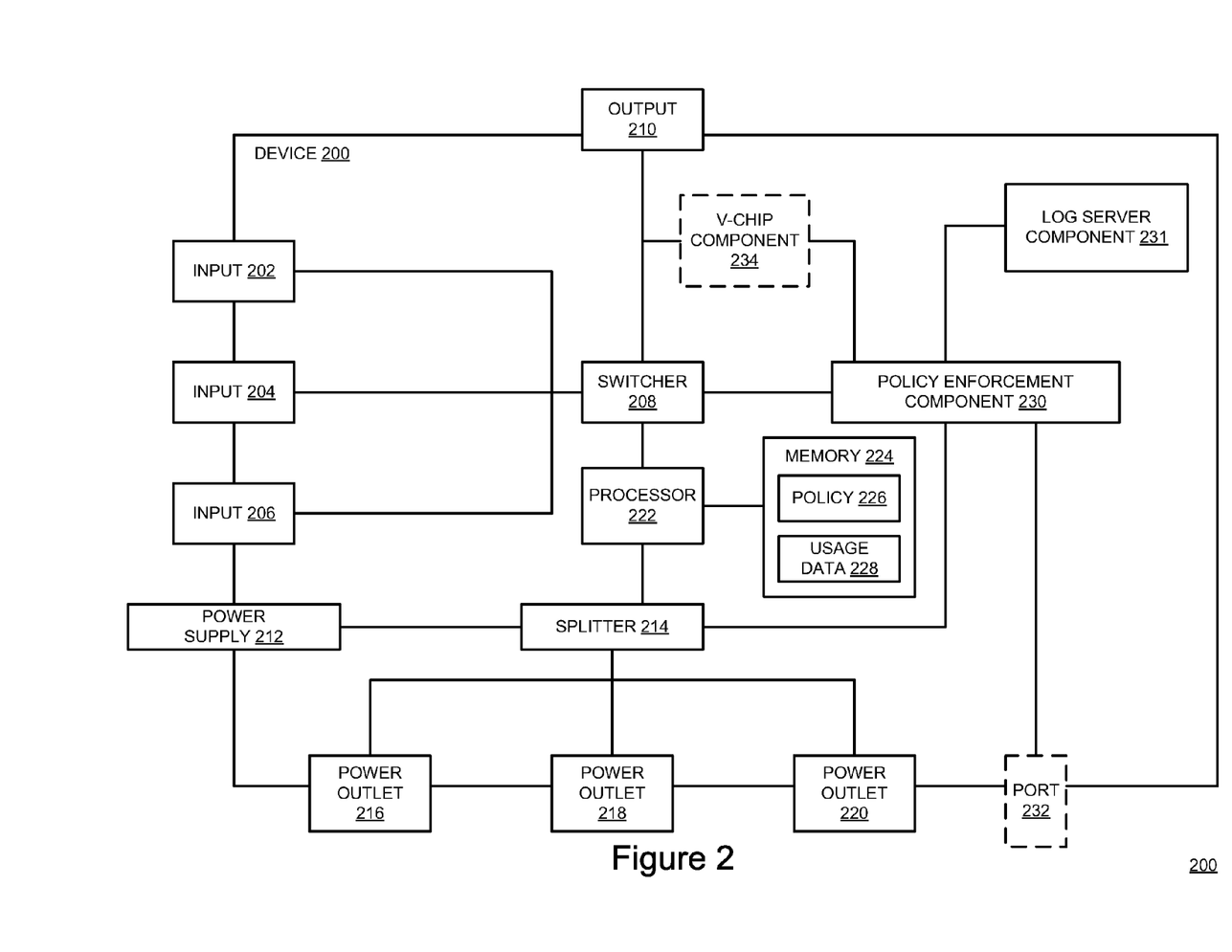
FIG. 2 is a block diagram of a device for controlling audio/video display using a policy according to one or more embodiments of the present invention.

FIG. 2 is a block diagram of a device 200 for controlling audio/video display using a policy according to one or more embodiments. The device 200 includes various components for controlling electrical power and/or audio/video signals utilized by various entertainment devices (e.g., a television, a video game console, a media player and/or the like). In one embodiment, the device includes an input 202, an input 204 and an input 206, which are adapted to receive the audio/video signals from various entertainment devices (e.g., the sources 120 of FIG. 1). For instance, each of the input 202, the input 204 and the input 206 may include one or more sockets that couple with one or more connectors in accordance with various audio/video interface technologies (e.g., coaxial, component audio/video, HDMI (High-Definition Multimedia Interface), composite audio/video and/or the like).

The input 202, the input 204 and the input 206 may be coupled with a switcher 208. Generally, the switcher 208 may be a hardware component (i.e., an audio/video signal switcher). As such, the switcher 208 controls the communication of audio/video signals to an output 210. Generally, the output 210 may include one or more sockets that are adapted to couple with one or more connectors attached to a display device (e.g., a television, a computer monitor, a projector and/or the like).

The device 200 may further include a power supply 212 (e.g., a battery). Alternatively, the power supply 212 may be a socket that is configured to couple with a power input cable that is connected to a wall outlet. Accordingly, electrical power flows from the wall outlet to the device 200 through the power supply 212. The device 200 further includes a splitter 214 that couples the power supply 212 with a power outlet 216, a power outlet 218 and a power outlet 220. Generally, the splitter 214 manages the electrical power provided by the power supply 212. In one embodiment, the splitter 214 distributes the electrical power amongst any combination of the power outlet 216, the power outlet 218 and/or the power outlet 220. In another embodiment, the splitter 214 prevents the communication of the electrical power to the power outlet 216, the power outlet 218 and/or the power outlet 220. In other words, the splitter 214 is configured to shut off electrical power to various entertainment devices.

The device 200 may further include a processor 222 as well as a memory 224. The memory 224 includes a policy 226. The memory 224 further includes various data, such as usage data 228 regarding power consumption patterns by one or more entertainment devices. According to one or more embodiments, the power consumption patterns define an ON state and/or an OFF/standby state for the one or more entertainment devices. Hence, the ON state denotes that a particular entertainment device is powered on; whereas, the OFF/standby state denotes that the particular entertainment device is powered off.

The device 200 further includes a policy enforcement component 230 for configuring the switcher 208 and the splitter 214 using the policy 226. The policy enforcement component 230 may be a hardware component (e.g., a semiconductor device). Alternatively, the policy enforcement component 230 may include software code stored in the memory 224. In one embodiment, the policy enforcement component 230 examines the usage data 228 to identify an ON state (i.e., powered on) as well as an OFF/standby state (i.e., powered off) for the one or more entertainment devices. The device 200 further includes a log server component 231 where event information is stored and/or communicated to a log server (e.g., the server 104 of FIG. 1). For example, a parent may access and retrieve the event information from the log server component 231 in order to view one or more events associated with one or more children.

In operation, the switcher 208 monitors the input 202, the input 204 and the input 206 for audio/video signals. In one embodiment, the switcher 208 determines a disruption at any of the input 202, the input 204 and the input 206. For example, the switcher 208 determines that a particular entertainment device is unplugged from the input 202 and communicates information regarding the disruption to the policy enforcement component 230. Accordingly, the policy enforcement component 230 stores event information that indicates the disruption of the audio/video signal at the input 202 in the log server component 231.

In response to detection of an audio/video signal at any of the input 202, the input 204 and the input 206, the switcher 208 routes the audio/video signal according to the policy 226. In one embodiment, the switcher 208 applies the policy 226 to information associated with the audio/video signal in order to produce an application result, which is used to determine whether the audio/video signal is to be displayed or blocked. In one embodiment, the switcher 208 communicates the application result to the policy enforcement component 230. If the application result indicates that the audio/video signal is to be displayed, the switcher 208 communicates the audio/video signal to the output 210. On the other hand, if the application result indicates that the audio/video signal is to be blocked (e.g., a policy violation), the switcher 208 prevents the communication of the audio/video signal.

According to various embodiments, the switcher 208 determines the information associated the audio/video signal. In one embodiment, the switcher 208 identifies a source of the audio/video signal as well as time and date data. If the switcher 208 determines that the audio/video signal violates the policy 226 based on the identified source and/or the time and date data, the switcher 208 blocks the audio/video signal. For example, the policy 226 may indicate that a video game console cannot be operated after midnight (twelve AM). Furthermore, the video game console may be coupled to the input 202. If the switcher 208 detects an audio/video signal at the input 202, the policy 226 is applied to information associated with the audio/video signal (e.g., source of the audio/video signal, time and date data and/or the like). For example, if the switcher 208 detects the audio/video signal after midnight, then the audio/video signal violates the policy 226 (i.e., a policy violation). Subsequently, the switcher 208 blocks the audio/video signal. As such, communication of the audio/video signal to the audio/video display device is prevented. If, on the other hand, the switcher 208 detects the audio/video signal before midnight, the communication of the audio/video signal to the audio/video display device is permitted. Accordingly, the switcher 208 communicates the audio/video signal to the display device.

Optionally, the device 200 includes a port 232 that is designed to couple with a convertor (i.e., a cable box). For example, the port 232 may be referred to as a cable box serial port, which includes a serial port hardware interface to any supporting cable box. Generally, the convertor processes an audio/video signal from a source (e.g., Cable Television service, Satellite Television service and/or the like) and retransmits the audio/video signal to the display device in a standard frequency. In one embodiment, the port 232 is configured to determine a channel to which the convertor is tuned using relevant protocols. Subsequently, the port 232 communicates information regarding the channel to the policy enforcement component 230, where the policy 226 is applied.

For instance, the port 232 may determine that a television is currently tuned to a particular channel. Accordingly the policy enforcement component 230 applies the policy 226 to the particular channel associated with the audio/video signal. If the policy 226 indicates that the audio/video signal is permitted to be displayed on a television, the policy enforcement component 230 instructs the switcher 208 to communicate the audio/video signal. However, if the policy enforcement component 230 determines that the particular channel violates the policy 226, the policy enforcement component 230 instructs the switcher 208 to block communication of the audio/video signal to the television. Alternatively, the policy enforcement component 230 instructs the splitter 214 to prevent communication of electrical power to the television and/or the DVD player.

In another optional embodiment, the device 200 includes a v-chip component 234 that monitors content represented by the audio/video signals. The v-chip component 234 is configured to determine a parental rating (e.g., MPAA (Motion Picture Association of America) rating) associated with the content. Subsequently, the v-chip component 234 communicates information regarding the parental rating to the policy enforcement component 230, where the policy 226 is applied. In addition, the policy enforcement component 230 generates event information that indicates the parental rating associated with the content. Accordingly, the v-chip component 234 and the policy enforcement component 230 cooperate to control audio/video signal communication and display by various entertainment devices.

For example, the v-chip component 234 examines content (e.g., a movie) generated by a DVD player and determines an inappropriate language rating within the audio/video signal. The v-chip component 234 communicates the inappropriate language rating to the policy enforcement component 230. Then, the policy enforcement component 230 applies the policy 226 to the inappropriate language rating regarding the audio/video signal. If the policy 226 indicates that the audio/video signal is permitted to be displayed on a television, the policy enforcement component 230 instructs the switcher 208 to communicate the audio/video signal. However, if the policy enforcement component 230 determines that the inappropriate language rating violates the policy 226, the policy enforcement component 230 instructs the switcher 208 to block communication of the audio/video signal to the television. Alternatively, the policy enforcement component 230 instructs the splitter 214 to prevent communication of electrical power to the television and/or the DVD player.

Figure 3:
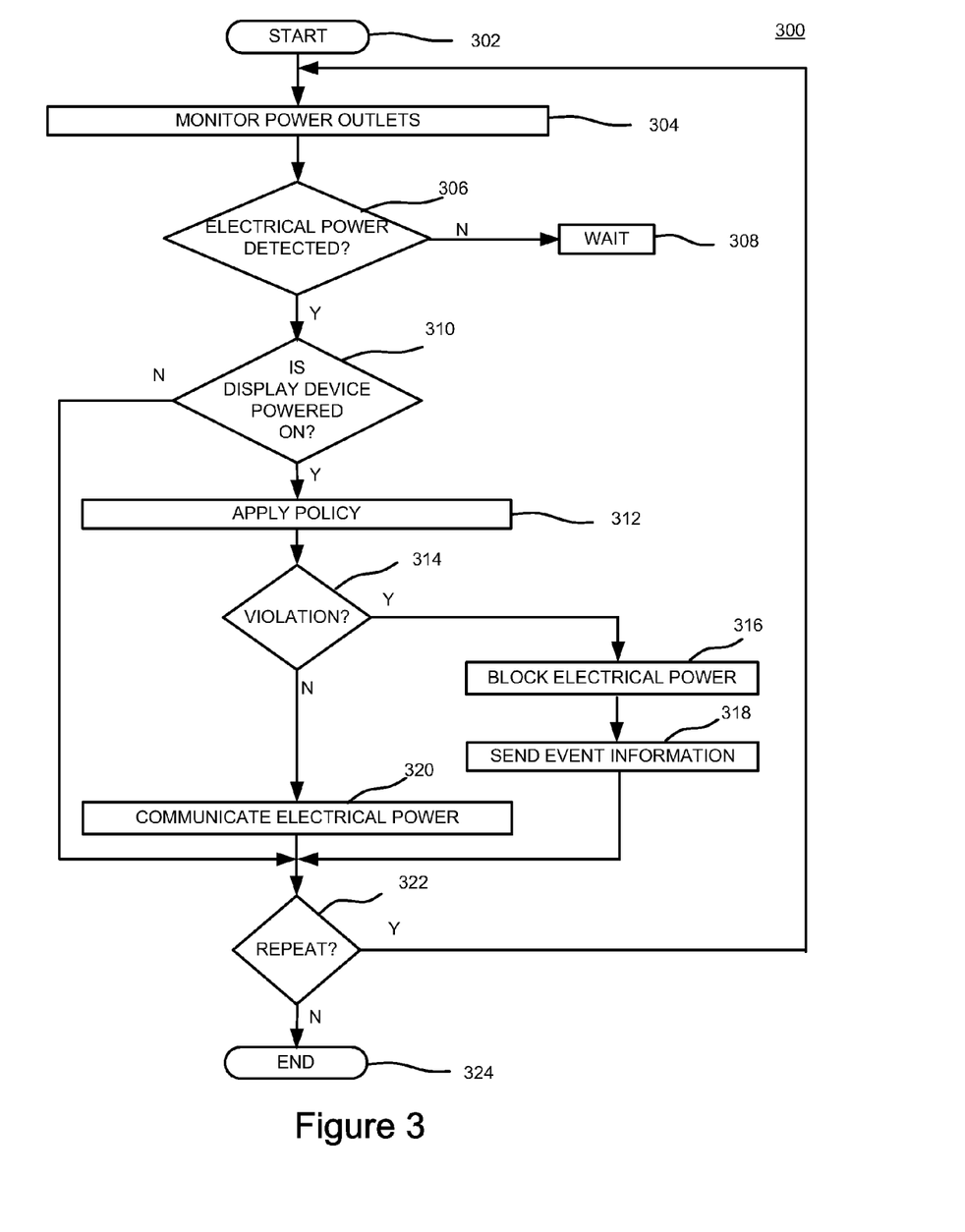
FIG. 3 is a flow diagram of a method for routing electrical power for an entertainment device using a policy to control audio/video display according to one or more embodiments of the present invention.

FIG. 3 is a flow diagram of a method 300 for routing electrical power for an entertainment device using a policy to control audio/video display according to one or more embodiments. In one embodiment, the method 300 starts at step 302 and proceeds to step 304 where one or more power outlets are monitored.

At step 306, a determination is made as to whether electrical power is detected at any of the power outlets. If electrical power is not detected at any of the power outlets, the method 300 proceeds to step 308. At step 308, the method 300 waits for electrical power. If electrical power is detected at any of the power outlets, the method 300 proceeds to step 310. At step 310, a determination is made as to whether the entertainment device is powered on (i.e., in a powered on state). If the entertainment device is powered off (i.e., in a powered off state), then the method 300 proceeds to step 322. If the entertainment device is powered on, then the method 300 proceeds to step 312. At step 312, a policy is applied to information regarding the electrical power. In one embodiment, the policy is compared with date and time data of the electrical power consumption by the entertainment device.

At step 314, a determination is made as to whether the electrical power consumption by the entertainment device violates the policy. If there is a policy violation, the method 300 proceeds to step 316. At step 316, the electrical power is blocked. In one embodiment, electrical power consumption by the entertainment device is prevented. For example, a splitter blocks transmission of the electrical power to a television or a video game console. At step 318, event information is communicated. As an example, the splitter communicates the event information indicating the blocked transmission to a policy enforcement component. Furthermore, the event information is communicated to a server and stored as an event log.

If there is no policy violation, the method 300 proceeds to step 320. At step 320, the electrical power is communicated to the entertainment device. For example, the splitter permits the transmission of the electrical power to the television or the video game console. At step 322, a determination is made as to whether the method 300 is to be repeated. If the method 300 is to be repeated, the method 300 returns to step 302. If the method 300 is not to be repeated, the method 300 proceeds to step 324. At step 324, the method 300 ends.

Figure 4:
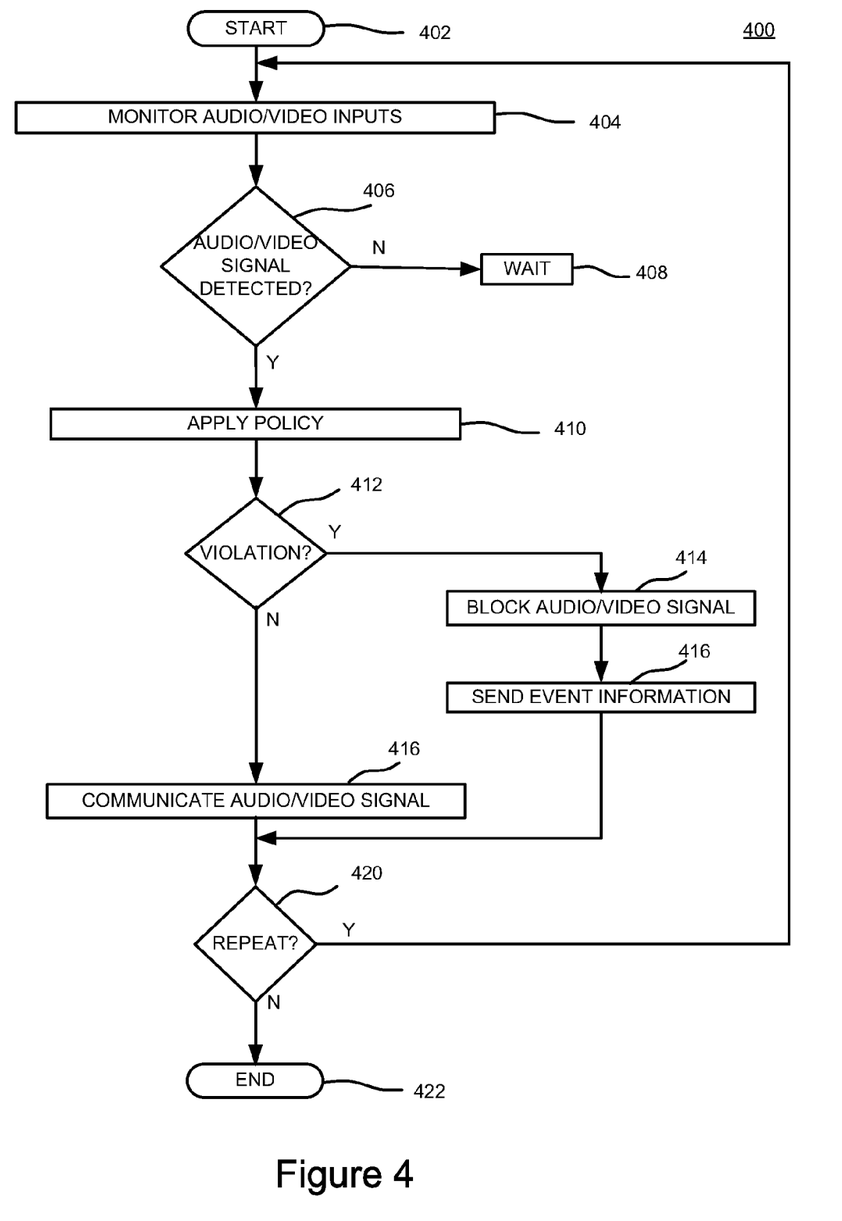
FIG. 4 is a flow diagram of a method for routing an audio/video signal from an entertainment device using a policy to control audio/video display according to one or more embodiments of the present invention.

FIG. 4 is a flow diagram of a method 400 for routing an audio/video signal from an entertainment device using a policy to control audio/video display according to one or more embodiments. In one embodiment, the method 400 starts at step 402 and proceeds to step 404 where one or more audio/video signal inputs are monitored.

At step 406, a determination is made as to whether an audio/video signal is detected at any of the audio/video signal inputs. If an audio/video signal is not detected at any of the audio/video signal inputs, the method 400 proceeds to step 408. At step 408, the method 400 waits for audio/video signal. If audio/video signal is detected at any of the audio/video signal inputs, the method 400 proceeds to step 410. At step 410, a policy is applied to information regarding the audio/video signal. In one embodiment, the policy is compared with date and time data of the audio/video signal display by the entertainment device.

At step 412, a determination is made as to whether audio/video signal display by the entertainment device violates the policy. If there is a policy violation, the method 400 proceeds to step 414. At step 414, the audio/video signal is blocked. In one embodiment, the audio/video signal display by the entertainment device is prevented. For example, a switcher blocks transmission of the audio/video signal to a television from a video game console. At step 416, event information is communicated. As an example, the switcher communicates the event information indicating the blocked transmission to a policy enforcement component. Furthermore, the event information is communicated to a server and stored as an event log.

If there is no policy violation, the method 400 proceeds to step 418. At step 418, the audio/video signal is communicated to the entertainment device. For example, the switcher permits the transmission of the electrical power to the television from the video game console. At step 420, a determination is made as to whether the method 400 is to be repeated. If the method 400 is to be repeated, the method 400 returns to step 402. If the method 400 is not to be repeated, the method 400 proceeds to step 422. At step 422, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for policy-based control of an audio/video display, comprising:
    monitoring, at a first device, at least one audio/video signal input and at least one power outlet using a policy, wherein the policy defines information for controlling audio/video display, and wherein the policy is compared with date and time data of an entertainment device;
    in response to a detection of at least one of an audio/video signal at the at least one audio/video signal input or an electrical power at the at least one power outlet, routing the at least one of the audio/video signal or the electrical power according to the policy;
    determining, at the first device, whether a first disruption has occurred at the at least one audio/video signal input or the at least one power outlet;
    generating first event information, at the first device, when it is determined that the at least one of the audio/video signal or the electrical power violates the policy, the first event information indicating how the policy was violated;
    generating second event information, at the first device, when it is determined that the first disruption has occurred, wherein the second event information indicates the occurrence of the first disruption and whether the first disruption occurred at the at least one audio/video signal input or the at least one power outlet; and
    transmitting, from the first device to a server, a heartbeat, wherein the server is configured to determine whether a second disruption has occurred at the first device based on the received heartbeat.

2. The method of claim 1, wherein routing the at least one of the audio/video signal or the electrical power further comprises communicating the at least one of the audio/video signal or the electrical power to an audio/video display device, and wherein the first device supplies power to the entertainment device and the audio/video display device in accordance with the policy.

3. The method of claim 1, wherein routing the at least one of the audio/video signal or the electrical power further comprises blocking the at least one of the audio/video signal or the electrical power when a policy violation is detected.

4. The method of claim 1, wherein monitoring the at least one of at least one audio/video signal input or at least one power outlet further comprises examining electrical power consumption regarding the entertainment device to determine usage data that defines an ON state for the entertainment device.

5. The method of claim 1, wherein routing the at least one of the audio/video signal or the electrical power further comprises applying the policy to information associated with the at least one of the audio/video signal or the electrical power to produce an application result, and wherein the information identifies the entertainment device associated with the audio/video signal or the electrical power.

6. The method of claim 5, wherein routing the at least one of the audio/video signal or the electrical power further comprises determining a policy violation of the policy based on the application result.

7. The method of claim 1, wherein the first event information regarding the at least one of the audio/video signal or the electrical power is communicated to and stored at the server.

8. The method of claim 1, wherein the first disruption occurs when the entertainment device becomes disconnected from the at least one audio/video signal input or the at least one power outlet, and wherein the first device does not transmit the heartbeat to the server when the first device becomes disabled.

9. An apparatus for policy-based control of audio/video display, comprising:
a memory, comprising a policy for controlling audio/video display, wherein the policy is compared with date and time data of an entertainment device;
a splitter that monitors at least one power outlet to detect an electrical power and route the electrical power to the entertainment device according to the policy;
a switcher that monitors at least one audio/video signal input to detect an audio/video signal and route the audio/video signal to the entertainment device according to the policy;
a log generator that generates first event information when it is determined that the at least one of the audio/video signal input or the electrical power violates the policy, the first event information indicating how the policy was violated, wherein the log generator generates second event information when it is determined that a first disruption has occurred at the at least one audio/video signal input or the at least one power outlet, the second event information indicating the occurrence of the first disruption and whether the first disruption occurred at the at least one audio/video signal input or the at least one power outlet; and
a heartbeat transmitter that transmits a heartbeat to a server, wherein the server is configured to determine whether a second disruption has occurred at the apparatus based on the received heartbeat.

10. The apparatus of claim 9, further comprising:
a policy enforcement component that configures at least one of the splitter or the switcher with various control settings defined by the policy.

11. The apparatus of claim 10, wherein the policy enforcement component applies the policy to information associated with the at least one of the audio/video signal or the electrical power to determine a policy violation.

12. The apparatus of claim 9, further comprising:
a v-chip component that determines a parental rating associated with the audio/video signal.

13. The apparatus of claim 9, further comprising:
a port for interfacing with a convertor to determine a channel associated with the audio/video signal.

14. The apparatus of claim 9, wherein the splitter communicates the electrical power to the entertainment device when the detected electrical power does not violate the policy.

15. The apparatus of claim 9, wherein the splitter prevents communication of the audio/video signal to the entertainment device when the detected electrical power violates the policy.

16. The apparatus of claim 9, wherein the switcher communicates the audio/video signal to the entertainment device when the detected audio/video signal does not violate the policy.

17. The apparatus of claim 9, wherein the switcher prevents communication of the audio/video signal to the entertainment device when the detected audio/video signal violates the policy.

18. A system for policy-based control of an audio/video display, comprising:
a device that controls the audio/video display using a policy, wherein the policy is compared with date and time data of the audio/video display, the device comprising:
a splitter that monitors at least one power outlet to detect an electrical power and route the electrical power according to the policy;
a switcher that monitors at least one audio/video signal input to detect an audio/video signal and route the audio/video signal according to the policy; and
a log generator that generates first event information when it is determined that the at least one audio/video signal input or the electrical power violates the policy; wherein the log generator generates second event information when it is determined that a first disruption has occurred at the at least one audio/video signal input or the at least one power outlet;
a heartbeat transmitter that transmits a heartbeat to a server; and
a computer coupled to the device, comprising:
an interface that generates the policy and communicates the policy to the device; and
the server that stores the first and second event information from the device and generates an event log, the first event information indicating how the policy was violated and the second event information indicating the occurrence of the first disruption and whether the first disruption occurred at the at least one audio/video signal input or the at least one power outlet, wherein the server is configured to determine whether a second disruption has occurred at the device based on the heartbeat.

19. The system of claim 18, wherein the device further comprises a policy enforcement component for configuring at least one of the splitter or the switcher with various control settings defined by the policy.

20. The system of claim 19, wherein the policy enforcement component applies the policy to information associated with the at least one of the audio/video signal or the electrical power to determine a policy violation.

* * * * *